(12) United States Patent
D'Afonseca et al.

(10) Patent No.: US 11,175,421 B2
(45) Date of Patent: Nov. 16, 2021

(54) DEVICE AND METHOD FOR MITIGATING CYCLE-SKIPPING IN FULL WAVEFORM INVERSION

(71) Applicant: CGG SERVICES (U.S.) INC., Houston, TX (US)

(72) Inventors: Luis D'Afonseca, Rio de Janeiro (BR); Alejo Sansigre, Rio de Janeiro (BR); Andrew Ratcliffe, Henfield (GB); Hongbo Bi, Katy, TX (US); Tao Lin, Houston, TX (US)

(73) Assignee: CGG SERVICES SAS, Massy (FR)

( * ) Notice: Subject to any disclaimer, the term of this patent is extended or adjusted under 35 U.S.C. 154(b) by 447 days.

(21) Appl. No.: 15/107,614

(22) PCT Filed: Jan. 9, 2015

(86) PCT No.: PCT/US2015/010768
§ 371 (c)(1),
(2) Date: Jun. 23, 2016

(87) PCT Pub. No.: WO2015/106065
PCT Pub. Date: Jul. 16, 2015

(65) Prior Publication Data
US 2016/0320505 A1 Nov. 3, 2016

Related U.S. Application Data

(60) Provisional application No. 62/021,027, filed on Jul. 4, 2014, provisional application No. 61/945,843, filed (Continued)

(51) Int. Cl.
*G01V 1/30* (2006.01)
*G01V 1/28* (2006.01)
*G01V 1/34* (2006.01)

(52) U.S. Cl.
CPC ............... *G01V 1/306* (2013.01); *G01V 1/28* (2013.01); *G01V 1/282* (2013.01); *G01V 1/303* (2013.01);
(Continued)

(58) Field of Classification Search
CPC ........ G01V 1/306; G01V 1/282; G01V 1/303; G01V 2200/14; G01V 2210/614;
(Continued)

(56) References Cited

U.S. PATENT DOCUMENTS 3,594,795 A * 7/1971 Thor ............... G01S 13/282
333/166
3,714,653 A * 1/1973 Thor ............... G01S 13/282
333/166

(Continued)

FOREIGN PATENT DOCUMENTS

GB   2481270 A * 12/2011 ............... G01V 1/28
GB   2503640 A *  1/2014 ............. G01V 1/282
(Continued)

OTHER PUBLICATIONS

John A. Scales, "Theory of Seismic Imaging", Samizdat Press, Release 2.2. Jan. 1997.*
(Continued)

*Primary Examiner* — Douglas Kay
(74) *Attorney, Agent, or Firm* — Patent Portfolio Builders PLLC

(57) ABSTRACT

Computing device, computer instructions and method for identifying seismic traces prone to cycle-skipping in a full waveform inversion method. The method includes receiving recorded seismic data recorded with seismic sensors over a subsurface of interest; selecting a model that describes the subsurface; calculating, based on the model and the recorded seismic data, estimated seismic data; and choosing a proba-
(Continued)

bilistic measure that characterizes a relationship between the recorded seismic data and the estimated seismic data. The probabilistic measure includes at least one statistical function.

19 Claims, 10 Drawing Sheets

Related U.S. Application Data on Feb. 28, 2014, provisional application No. 61/927,194, filed on Jan. 14, 2014, provisional application No. 61/925,709, filed on Jan. 10, 2014.

(52) U.S. Cl.
CPC .......... *G01V 1/345* (2013.01); *G01V 2200/14* (2013.01); *G01V 2210/614* (2013.01); *G01V 2210/6222* (2013.01); *G01V 2210/66* (2013.01); *G01V 2210/667* (2013.01); *G01V 2210/67* (2013.01)

(58) Field of Classification Search
CPC ....... G01V 2210/6222; G01V 2210/66; G01V 2210/667; G01V 2210/67; G01V 1/28; G01V 1/345
USPC .......................................................... 702/14
See application file for complete search history.

(56) References Cited

U.S. PATENT DOCUMENTS

| | | | | |
|---|---|---|---|---|
| 3,887,775 | A * | 6/1975 | Montefusco | H04B 3/462 |
| | | | | 324/76.82 |
| 4,985,683 | A * | 1/1991 | O'Neill | G01R 25/00 |
| | | | | 327/3 |
| 4,992,992 | A | 2/1991 | Dragoset, Jr. | |
| 5,287,328 | A * | 2/1994 | Anderson | G01V 1/364 |
| | | | | 367/38 |
| 5,481,501 | A | 1/1996 | Blakeslee et al. | |
| 5,659,520 | A | 8/1997 | Watson et al. | |
| 5,764,516 | A * | 6/1998 | Thompson | G01V 1/362 |
| | | | | 367/54 |
| 5,923,383 | A | 7/1999 | Kim | |
| 6,665,617 | B2 * | 12/2003 | Shobayashi | G01V 1/30 |
| | | | | 702/14 |
| 8,223,587 | B2 * | 7/2012 | Krebs | G01V 1/282 |
| | | | | 367/43 |
| 8,593,904 | B2 | 11/2013 | Soubaras | |
| 9,291,735 | B2 * | 3/2016 | Lu | G01V 99/00 |
| 9,945,970 | B1 * | 4/2018 | Abel | G01V 1/288 |
| 10,928,534 | B2 * | 2/2021 | Warner | G01V 1/282 |
| 2005/0028579 | A1 | 2/2005 | Owen | |
| 2005/0037786 | A1 * | 2/2005 | Edge | H04W 56/002 |
| | | | | 455/502 |
| 2005/0069031 | A1 * | 3/2005 | Sunter | H04L 1/205 |
| | | | | 375/224 |
| 2008/0077337 | A1 | 3/2008 | Yoshinaga | |
| 2008/0228402 | A1 | 9/2008 | Ferber | |
| 2011/0238390 | A1 * | 9/2011 | Krebs | G01V 1/282 |
| | | | | 703/2 |
| 2012/0140593 | A1 * | 6/2012 | Stoffa | G01V 1/42 |
| | | | | 367/38 |
| 2012/0176861 | A1 | 7/2012 | Abma et al. | |
| 2012/0289852 | A1 | 11/2012 | Van Den Aardweg | |
| 2012/0314538 | A1 | 12/2012 | Washbourne et al. | |
| 2012/0316791 | A1 * | 12/2012 | Shah | G01V 1/282 |
| | | | | 702/14 |
| 2012/0320712 | A1 * | 12/2012 | Aqrawi | G01V 1/302 |
| | | | | 367/53 |
| 2014/0278299 | A1 * | 9/2014 | Hill | G06F 17/5009 |
| | | | | 703/2 |
| 2015/0088424 | A1 * | 3/2015 | Burlakov | G01V 99/00 |
| | | | | 702/6 |
| 2016/0070023 | A1 * | 3/2016 | Herrmann | G01V 99/005 |
| | | | | 702/14 |
| 2016/0238729 | A1 * | 8/2016 | Warner | G01V 1/364 |

FOREIGN PATENT DOCUMENTS

| | | | | |
|---|---|---|---|---|
| GB | 2504158 | A * | 1/2014 | ............ G01V 1/282 |
| GB | 2509223 | A * | 6/2014 | ............ G01V 1/364 |
| GB | 2509223 | A | 6/2014 | |
| WO | 2013/028237 | A1 | 2/2013 | |
| WO | 2013/093467 | A1 | 6/2013 | |
| WO | 2013/093468 | A1 | 6/2013 | |
| WO | WO 2013093468 | A2 * | 6/2013 | |

OTHER PUBLICATIONS

R. Gerhard Pratt, "Seismic waveform inversion in the frequency domain, Part 1 : Theory and verification in a physical scale model", Geophysics, vol. 64, No. 3 (May-Jun. 1999); p. 888-901.*
H. Chauris and et el, "What initial velocity model do we need for full waveform inversion?", 70th EAGE Conference & Exhibition—Rome, Italy, Jun. 9-12, 2008 (Year: 2008).*
W. Zhou, "Velocity model building by full waveform inversion of early arrivals & reflections and case study with gas cloud Effect", Velocity model building by full waveform inversion of early arrivals & reflections and case study with gas cloud effect. Earth Sciences. Université Grenoble Alpes, 2016 (Year: 2016).*
Extended European Search Report in corresponding European Application 15735418.4 dated Nov. 2, 2017. (All references not cited herewith have been previously made of record.).
International Search Report in related International Application No. PCT/US2015/010768, dated May 1, 2015.
Written Opinion of the International Searching Authority in related International Application No. PCT/US2015/010768, dated May 1, 2015.
H. Bi et al., "Effective Cycle Skipping Reduction through Adaptive Data Selection for Full Waveform Inversion", 76th EAGE Conference & Exhibition 2014, Amserdam RAI, The Netherlands, Jun. 16-19, 2014.
C. Bunks et al., "Multiscale Seismic Waveform Inversion", Geophysics, Sep.-Oct. 1995, vol. 60, No. 5, pp. 1457-1473.
D. Hale, "Dynamic Warping of Seismic Images", Geophysics, Mar.-Apr. 2013, vol. 78, No. 2, pp. S105-S115.
R. Jupp et al., "Application of Full Waveform Inversion to Variable-depth Streamer Data", SEG Annual Meeting, Las Vegas, Nevada, 2012, pp. 1-5.
Y. Ma et al., "Wave-equation Reflection Traveltime Inversion with Dynamic Warping and Hybrid Waveform Inversion", SEG Annual Meeting, Houston, Texas, 2013, pp. 871-876.
F. Mandroux et al., "Staggered Marine Acquisition Design for Complex Imaging", SEG Annual Meeting, Houston, Texas, 2013, pp. 26-30.
C. Manuel et al., "A Workflow for Full Waveform Inversion on the North West Shelf of Australia", SEG Annual Meeting, Houston, Texas, 2013, pp. 913-918.
A.M.S. Martinez-Sansigre et al., "A Probabilistic QC for Cycle-skipping in Full Waveform Inversion", 76th EAGE Conference & Exhibition 2014, Amserdam RAI, The Netherlands, Jun. 16-19, 2014.
N. Shah et al., "Quality Assured Full-waveform Inversion: Ensuring Starting Model Adequacy", SEG Annual Meeting, Las Vegas, Nevada, 2012, pp. 1-5.
L. Sirgue et al., "Efficient Waveform Inversion and Imaging: A Strategy for Selecting Temporal Frequencies", Geophysics, Jan.-Feb. 2004, vol. 69, No. 1, pp. 231-248.
J. Virieux et al., "An Overview of Full-waveform Inversion in Exploration Geophysics", Geophysics, Nov.-Dec. 2009, vol. 74, No. 6, pp. WCC1-WCC26.
A. Martinez-Sansigre et al., "A probabilistic QC for cycle-skipping in full waveform inversion", SEG Technical Program Expanded Abstracts, Denver, Aug. 5, 2014, pp. 1105-1109.

(56) References Cited

OTHER PUBLICATIONS

Partial supplementary European Search Report received in corresponding Application No. 15735418.4-1559, dated Jul. 28, 2017.

* cited by examiner

Fig. 1 (Background)

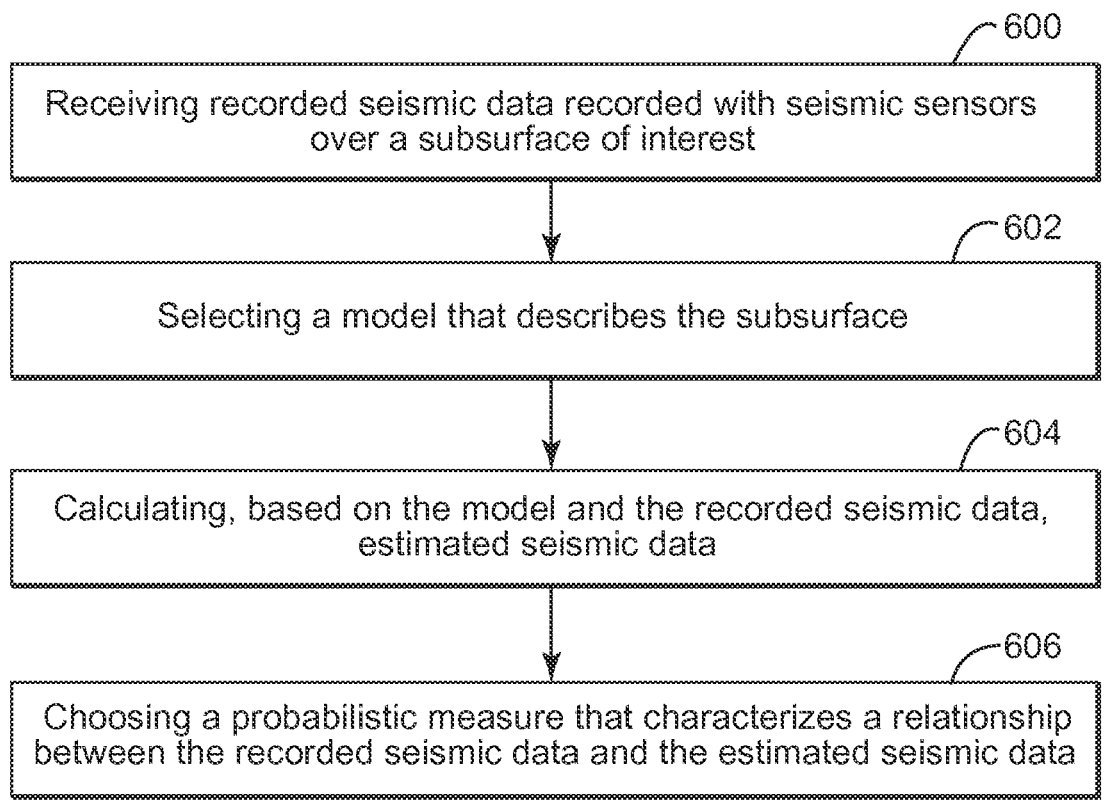

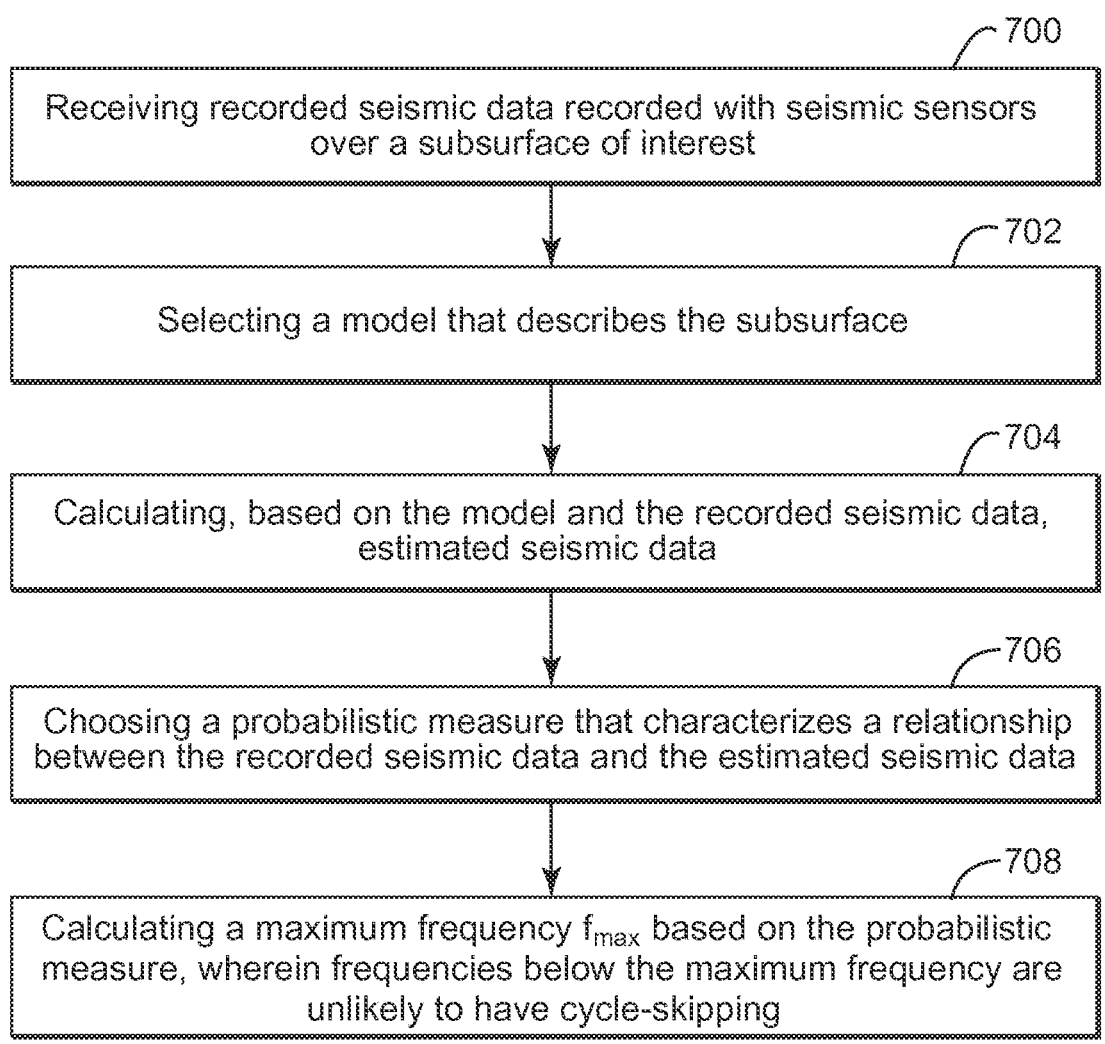

DEVICE AND METHOD FOR MITIGATING CYCLE-SKIPPING IN FULL WAVEFORM INVERSION

CROSS-REFERENCE TO RELATED APPLICATIONS

The present application is related to and claims the benefit of priority of U.S. Provisional Application 61/925,709 filed Jan. 10, 2014, titled, "CSKIP: A probabilistic QC for Cycle-Skipping in Full Waveform Inversion," authored by A. Sansigre and A. Ratcliffe; U.S. Provisional Application 61/927,194, filed Jan. 14, 2014, titled, "Effective Cycle Skipping Reduction Through Adaptive Data Selection for Full Waveform Inversion," authored by H. Bi and T. Lin; U.S. Provisional Application 61/945,843 filed Feb. 28, 2014, titled, "Determining the Maximum Frequency to be used in a time-domain FWI update of a velocity model," authored by A. Sansigre and A. Ratcliffe; and U.S. Provisional Application 62/021,027 filed Jul. 4, 2014, titled, "A probabilistic weighting scheme for the Full Waveform Inversion cost function," authored by D'afonseca et. al., the entire contents of which are incorporated herein by reference.

BACKGROUND

Technical Field

Embodiments of the subject matter disclosed herein generally relate to methods and systems and, more particularly, to mechanisms and techniques for mitigating cycle-skipping in full waveform inversion (FWI).

Discussion of the Background

Seismic data acquisition and processing generate a profile (image) of the geophysical structure (subsurface) under the seafloor. While this profile does not provide an accurate location for oil and gas, it suggests, to those trained in the field, the presence or absence of oil and/or gas. Thus, providing a high-resolution image of the subsurface is an ongoing process for the exploration of natural resources, including, among others, oil and/or gas.

During a seismic gathering process, as shown for instance in the marine case in FIG. 1, a vessel 110 tows plural detectors 112, which are disposed along a cable 114. Cable 114 and its corresponding detectors 112 are sometimes referred to, by those skilled in the art, as a streamer 116. Vessel 110 may tow plural streamers 116 at the same time. Streamers may be disposed horizontally, i.e., lie at a constant depth $z_1$ relative to the ocean surface 118. Also, plural streamers 116 may form a constant angle (i.e., the streamers may be slanted) with respect to the ocean surface as disclosed in U.S. Pat. No. 4,992,992, the entire content of which is incorporated herein by reference. In one embodiment, the streamers may have a curved profile as described, for example, in U.S. Pat. No. 8,593,904, the entire content of which is incorporated herein by reference.

Still with reference to FIG. 1, vessel 110 may also tow a seismic source 120 configured to generate an acoustic wave 122a. Acoustic wave 122a propagates downward and penetrates the seafloor 124, eventually being reflected by a reflecting structure 126 (reflector R). Reflected acoustic wave 122b propagates upward and is detected by detector 112. For simplicity, FIG. 1 shows only two paths 122a corresponding to the acoustic wave. Parts of reflected acoustic wave 122b (primary) are recorded by various detectors 112 (recorded signals are called traces), while parts of reflected wave 122c pass detectors 112 and arrive at the water surface 118. Since the interface between the water and air is well approximated as a quasi-perfect reflector (i.e., the water surface acts as a mirror for acoustic waves), reflected wave 122c is reflected back toward detector 112 as shown by wave 122d in FIG. 1. Wave 122d is normally referred to as a ghost wave because it is due to a spurious reflection. Ghosts are also recorded by detector 112, but with a reverse polarity and a time lag relative to primary wave 122b if the detector is a hydrophone. The degenerative effect that ghost arrival has on seismic bandwidth and resolution is known. In essence, interference between primary and ghost arrivals causes notches, or gaps, in the frequency content recorded by detectors.

Recorded traces may be used to determine the subsurface (i.e., earth structure below surface 124) and to determine the position and presence of reflectors 126, which is associated with the detection of oil and/or gas reservoirs. However, ghosts disturb the accuracy of the final image of the subsurface and, for at least this reason, various methods exist for removing the ghosts, i.e., deghosting, from the acquired seismic data.

FWI is one established tool in the toolbox of velocity model building. A key practical issue in its successful application is avoiding convergence to a local minimum during the inversion process. A large part of this local minimum problem is caused by the oscillatory nature of the seismic data and manifests itself as cycle-skipping on the data, with the model converging to the wrong event in the shot record. There is academic and industry activity in this area, although the standard way of addressing this problem is the hierarchical multi-scale approach proposed by Bunks et al. (1995, "Multiscale seismic wave-form inversion," Geophysics, 60, 1,457-1,473). In this method, successive inversions are performed with an increasing high-frequency cut-off value, and the assumption is that the starting point in this process, namely the data at the lowest available frequency, is not cycle-skipped.

However, existing methods are not always efficient or, if they are, they are expensive. Thus, there is a need to develop new FWI methods that mitigate cycle-skipping, or to develop QC (quality control) methods that can indicate data prone to cycle-skipping prior to running the FWI algorithms.

SUMMARY

According to an embodiment, there is a method for identifying seismic traces prone to cycle-skipping in a full waveform inversion method. The method includes receiving recorded seismic data recorded with seismic sensors over a subsurface of interest; selecting a model that describes the subsurface; calculating, based on the model and the recorded seismic data, estimated seismic data; and choosing a probabilistic measure that characterizes a relationship between the recorded seismic data and the estimated seismic data. The probabilistic measure includes at least one statistical function.

According to another embodiment, there is a method for determining a weight based on a data selection analysis. The method includes receiving recorded seismic data $d_{rec}$ recorded with seismic sensors over a subsurface of interest; estimating seismic data $d_{est}$ based on a starting model of the surveyed subsurface; calculating a travel-time difference ($\Delta t$) between the recorded data $d_{rec}$ and the estimated data $d_{est}$; converting the travel-time difference ($\Delta t$) to a phase difference; selecting seismic data with a phase difference between the recorded and estimated data of less than a half cycle; and feeding the selected seismic data to a full-wave inversion (FWD model for calculating physical properties of the subsurface of interest.

According to yet another embodiment, there is a computing device for identifying seismic traces prone to cycle-skipping in a full waveform inversion method. The computing device includes an interface configured to receive recorded seismic data recorded with seismic sensors over a subsurface of interest; and a processor connected to the interface. The processor is configured to select a model that describes the subsurface, calculate, based on the model and the recorded seismic data, estimated seismic data, and choose a probabilistic measure that characterizes a relationship between the recorded seismic data and the estimated seismic data. The probabilistic measure includes at least one statistical function.

According to still another embodiment, there is a computing device for determining a weight based on a data selection analysis. The computing device includes an interface configured to receive recorded seismic data $d_{rec}$ recorded with seismic sensors over a subsurface of interest; and a processor connected to the interface. The processor is configured to estimate seismic data $d_{est}$ based on a starting model of the surveyed subsurface, calculate a travel-time difference ($\Delta t$) between the recorded data $d_{rec}$ and the estimated data $d_{est}$, convert the travel-time difference ($\Delta t$) to a phase difference, select seismic data with a phase difference between the recorded and estimated data of less than a half cycle, and feed the selected seismic data to a full-wave inversion (FWI) model for calculating physical properties of the subsurface of interest.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 6 is a flowchart of a QC method for mitigating cycle-skipping based on a probabilistic measure;

FIG. 7 is a flowchart of a QC method for mitigating cycle-skipping based on another probabilistic measure;

DETAILED DESCRIPTION

Figure 1:
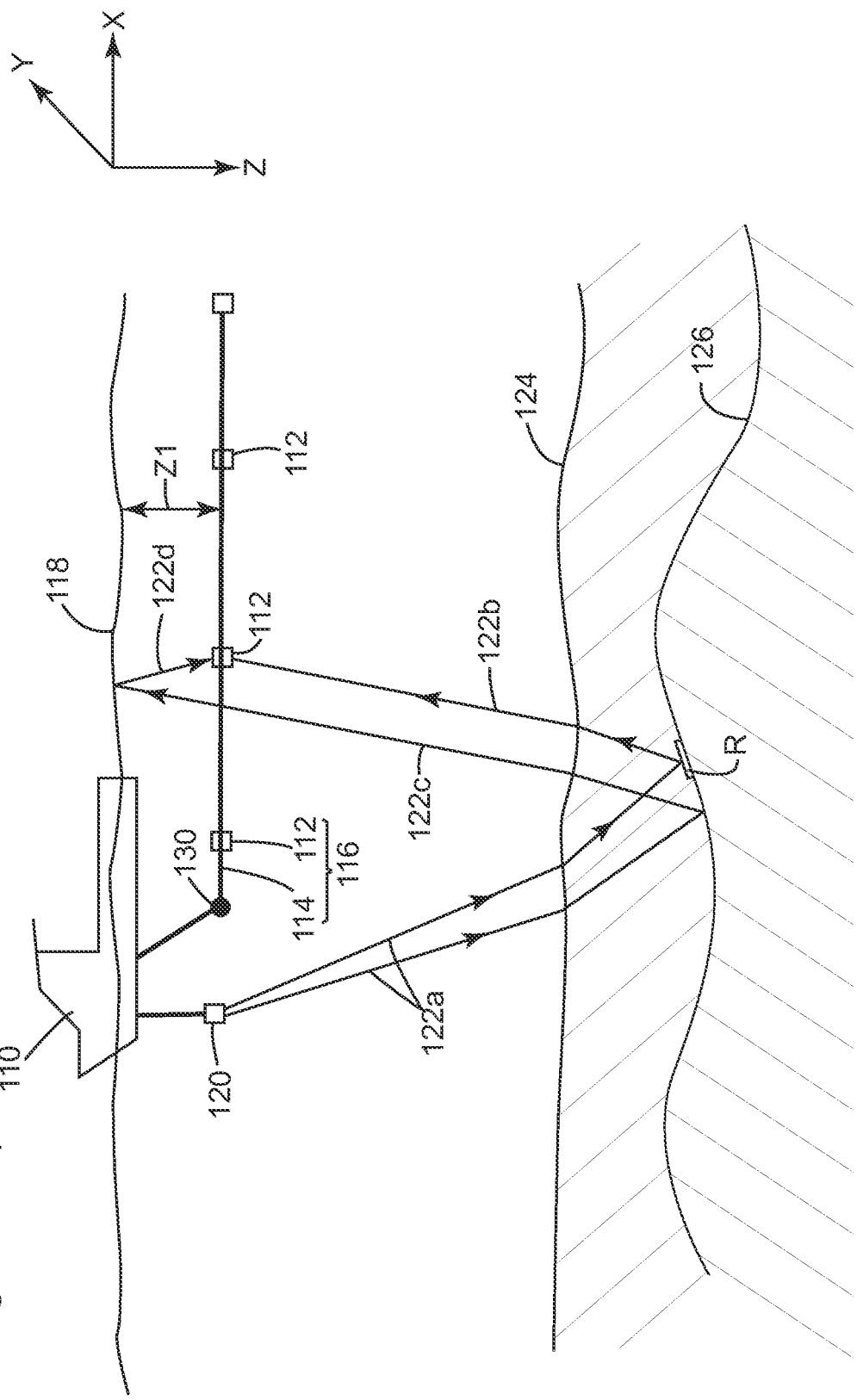
FIG. 1 is a schematic diagram of a conventional marine seismic data acquisition system having a horizontal streamer.

The following description of the exemplary embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

As noted in the Background section, land or marine seismic surveys can be used to extract rock properties and construct reflectivity images of the subsurface. Such surveys can provide an accurate image of the subsurface structure of the portion of the earth being surveyed. The subsurface structure may be associated with mineral resources and/or hydrocarbons reservoirs. To model and image the subsurface, one needs to know at least the seismic velocity Vp of the compressional waves, also known as P-waves or primary waves. In a portion of the volume of the Earth, Vp may be estimated in various ways.

FWI is one known method for analyzing seismic data. FWI is able to produce models in a subsurface region of physical properties such as Vp that have high fidelity and are well-resolved spatially. FWI seeks to extract the properties of subsurface rocks from a given seismic dataset recorded at the surface or seabed.

Essentially, the FWI technique generates a two- or three-dimensional model to represent the surveyed subsurface and then attempts to control the properties and parameters of the Earth model to generate estimated seismic data that matches the recorded seismic data.

The estimated seismic data may be calculated from the subsurface model based, for example, on the full two-way wave equation. FWI is an iterative process requiring a starting model. An accurate starting model for FWI may be provided by travel-time tomography. FWI can extract, for example, physical properties (Vp and Vs velocities, attenuation, density, anisotropy) of the surveyed subsurface. P-wave velocity Vp is a desired parameter on which the subsequent construction of the other parameters depends heavily upon. However, other parameters may be used in the following embodiments, either alone or in combination. The nature and number of parameters used in a model associated with a subsurface depends on the application.

The model is used to calculate an estimate of the seismic dataset. The estimated seismic dataset is then compared to the recorded seismic dataset. Then, through use of a convergent numerical iteration, the parameters of the model are modified until the estimated seismic dataset matches the recorded seismic data to a sufficient degree of accuracy or until a desired degree of convergence is obtained.

Figure 2:
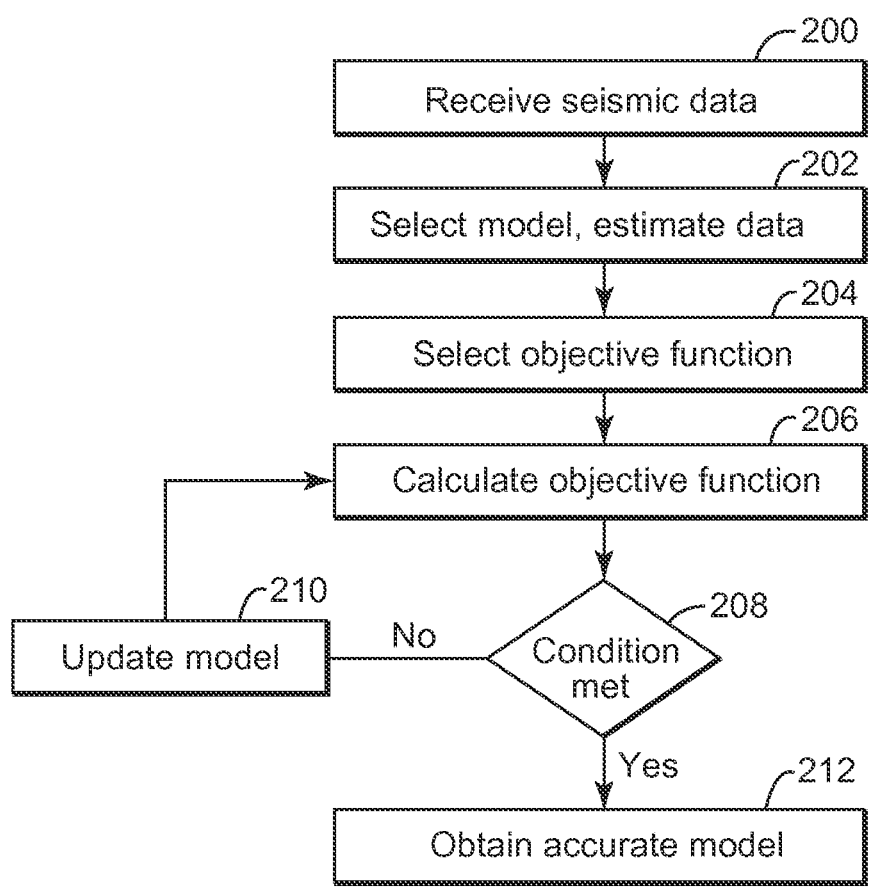
FIG. 2 is a flowchart of an FWI method.

A general method of updating the model with the FWI method is now described with regard to FIG. 2. FWI typically operates on the principle of iteratively updating the starting model to minimize (or maximize) a cost function through repeated calculations. In step 200, recorded seismic data is received. The recorded seismic data may be recorded on land or in a marine environment. It may be recorded with hydrophones, geophones, accelerometers, or any combination of these and other sensors. In step 202, a model is chosen (e.g., selected from an existing library, calculated based on existing data about the surveyed subsurface, etc.) and seismic data is estimated based on the current model. In step 204, a cost function is defined. The cost function may be a measure of the mismatch or similarity between the recorded seismic data and the estimated seismic data. If the cost function is selected to represent the mismatch between the recorded and estimated seismic data, it may compare traces from the two sets of data, for example, by subtracting one trace from another, i.e., one trace from each set of recorded and estimated seismic data.

Due to the non-linearity in the relationship between the model and the data, the cost function used in FWI may oscillate, rather than have a monotonic behavior. Because of this, it is necessary to have a sufficiently accurate starting model to achieve global minimum convergence. The cost function can be formulated in the frequency domain, the time domain or any other suitable domain.

Traditionally, localized gradient-based methods are used in step 206 for calculating the cost function. These methods iteratively update the existing model in a direction that derives from the cost function's direction of steepest descent. For this reason, after the cost function has been calculated in step 206, a given criterion (i.e., a predetermined condition) is checked in step 208. If the predetermined condition is not met, for example, how close the estimated data is to the recorded data, the process advances to step 210 in which the starting model is updated and a new data estimate is calculated. Then, the process returns to step 206 to recalculate the cost function. This FWI is a local iterative inversion scheme and the process makes in step 210 a series of step-wise improvements to the model, which successively reduces the cost function toward the predetermined condition.

Note that iteration steps 210 and 206 are necessary because the problem to be solved is non-linear, and the inverse problem has been linearized in particular stages. Implicitly, traditional inverse methods invoke the Born approximation, which assumes that the perturbation to a wave-field produced by changing a model is linearly related to the change in the model.

When the predetermined condition is met in step 208, the process advances to step 212, in which an accurate model has been obtained. The calculated model may then be used to calculate various parameters of the subsurface, generate an image of the subsurface, generate a velocity model, etc.

The above method, if converging to the global minimum, will lead to a model which is a correct representation of the surveyed subsurface. However, there are some difficulties associated with obtaining the desired convergence.

As discussed above, FWI methodology for the cost function relies upon a gradient method to solve the inverse problem. This requires that the estimated data generated from the starting model match the observed travel times to within half a cycle. However, recorded seismic data is limited in its frequency bandwidth. This means that real seismic signals are oscillatory.

Figure 3:
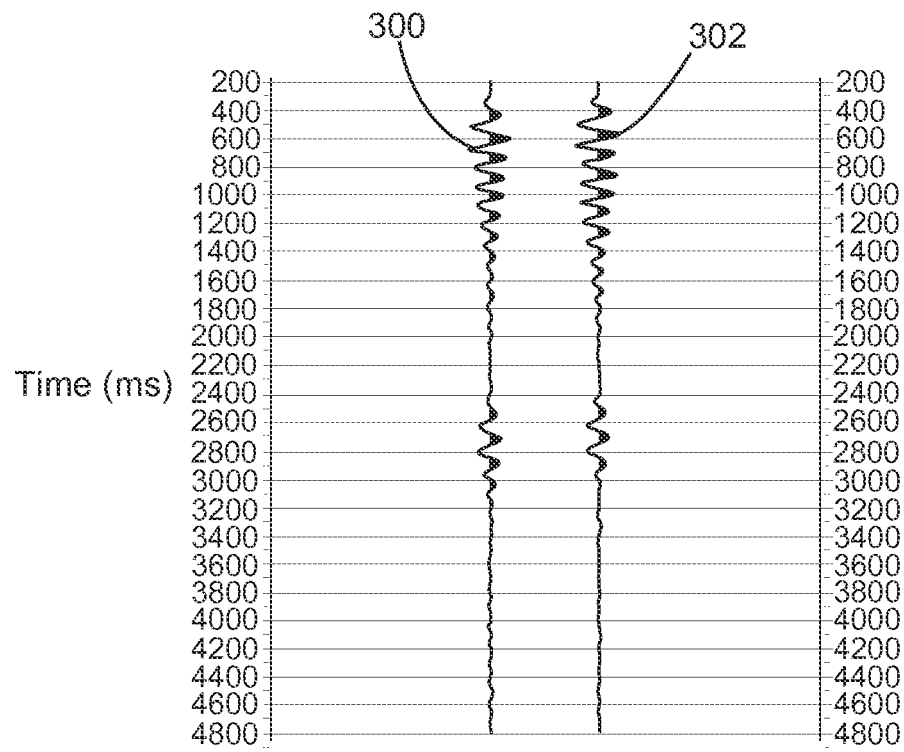
FIG. 3 illustrates a recorded trace and an estimated trace.
Figure 4:
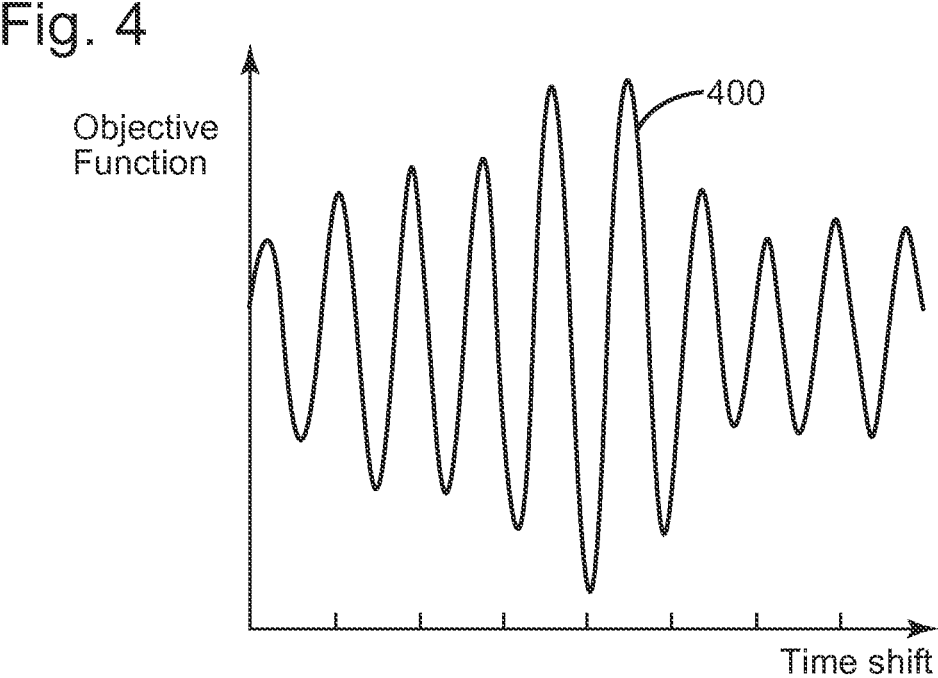
FIG. 4 illustrates the oscillatory nature of the cost function.

This problem is illustrated based on FIGS. 3 and 4, which correspond to FIGS. 4 and 5 of U.K. Patent Application GB 2509223. FIG. 3 shows a trace 300 corresponding to recorded seismic data and a trace 302 corresponding to estimated seismic data as a function of time (on the vertical axis). Trace 300 is received in step 200 and trace 302 is estimated in step 202. FIG. 4 shows a cost function 400 that calculates a difference between traces 300 and 302 for a range of trial time shifts. As shown, the value of the cost function, or misfit, or objective function, is oscillatory as a function of this time shift. Thus, an inaccurate starting model may generate estimated data that is more than half a cycle in error with respect to the recorded data. Such a situation is referred to as "cycle-skipped." When this occurs, because the methodology seeks only a local minimum, FWI will tend to modify the sub-surface model such that the estimated and recorded data are brought into alignment at the nearest cycle, and this will neither correspond to their correct alignment nor to the correct model. This misalignment to the nearest cycle will reduce the data misfit, and typical FWI schemes will become stranded in this position.

Consequently, as illustrated above, for successful convergence, the estimated seismic data needs to lie within half a wave cycle of the recorded data at the lowest useable frequency. In other words, the starting model needs to be sufficiently accurate to match the recorded seismic data to within half a wave cycle, otherwise FWI may mis-converge to a cycle-skipped local minimum.

As discussed above, the origin of cycle-skipping lies in the industrial FWI implementations that use a gradient-based algorithm that can only converge to the minimum in the model domain, that is, "local" to the starting point. While more sophisticated inversion algorithms exist that do not suffer the drawbacks of gradient-based techniques, they are much more expensive, and their application is beyond current practical implementations of FWI in the seismic industry.

Determining whether a given velocity model is good enough becomes an exercise in checking whether every trace in the shot record is not cycle-skipped. While this is sufficient to ensure convergence to the global minimum, given the non-linear and iterative nature of FWI, having every trace non-cycle-skipped is not a necessary condition. It was shown that a basic phase difference between recorded and estimated data can be used to highlight areas of cycle-skipping (Shah et al., 2012, "Quality assured full-waveform inversion: Ensuring starting model adequacy," $82^{nd}$ Annual International Meeting, SEG, Expanded Abstracts, 1-5). Such a quality control (QC) method requires some degree of interpretation to extract the necessary information.

According to an embodiment, an approach based on a probabilistic interpretation of frequency and/or time-shift is now discussed with regard to a QC method. Note that the QC method discussed herein detects traces that are likely to experience cycle-skipping. Synthetic or estimated traces are created using the starting velocity model, and the difference between the estimated and recorded data gives a cost function to be minimized by FWI. If the estimated traces have a delay time $\Delta t$ compared to the recorded traces, and the time delay $\Delta t$ is greater than $(2<f>)^{-1}$, where $<f>$ is the mean frequency of the data, then gradient methods will converge toward a local minimum and the updated velocity model will be biased. Thus, a QC approach is therefore to check that the time delay is smaller than $(2<f>)^{-1}$. Note that according to an embodiment, the mean frequency is calculated for a given trace. It is known that each trace includes all the frequencies in the seismic range of interest, e.g., between 1 and 300 Hz. Thus, the mean frequency for a given trace is expected to be similar to any other trace. When the mean frequency is calculated, the power spectrum of a trace is represented versus the frequency, often the trace has been high-cut filtered to the lowest useable frequency, and this is used for calculating the mean frequency.

Both the time delay Δt and the mean frequency <f> will suffer from uncertainties, and these should be taken into account when quantifying the risk of cycle-skipping in the inversion. According to an embodiment, a statistical estimator or operator or probabilistic measure may be used for the delay time. For example, a probability distribution, or density, function (PDF) is used as the estimator, and the PDF is characterized by the mean delay time <Δt> and a standard deviation $\sigma_{\Delta t}$. Interpreting the amplitude spectrum (i.e., distribution of power amplitude versus frequency) of the estimated data as the PDF of the frequency, it is possible to derive a mean frequency <f> and associated uncertainty $\sigma_f$. Then, it is possible to derive the cumulative distribution function (CDF) for the probability of cycle-skipping which, according to an implementation, is given by:

$$CDF(\Delta t) = \int_0^{\Delta t} PDF((\langle \tau \langle -[2 \langle f \rangle ]^{-1} | \sigma_{\Delta t}, \sigma_f)) d\tau \qquad (1)$$

where τ is a dummy time variable, and the vertical line inside equation (1) means that the PDF depends on $\sigma_{\Delta t}$ and $\sigma_f$. An example in this sense is provided later. Note that in one embodiment, the CDF is calculated for each trace.

Figure 5A:
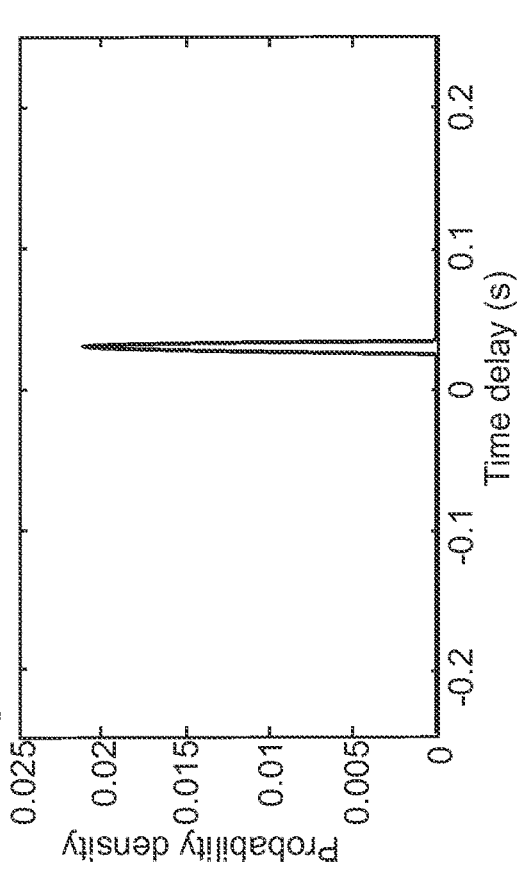
FIG. 5A illustrates a cost function for a given time delay.
Figure 5B:
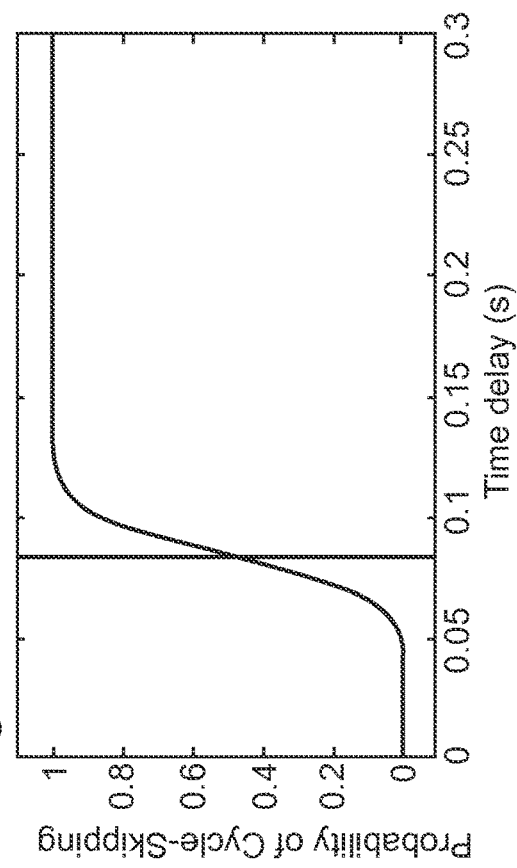
FIG. 5B illustrates the probability distribution function of the measured time delay, also known as the probability density.
Figure 5C:
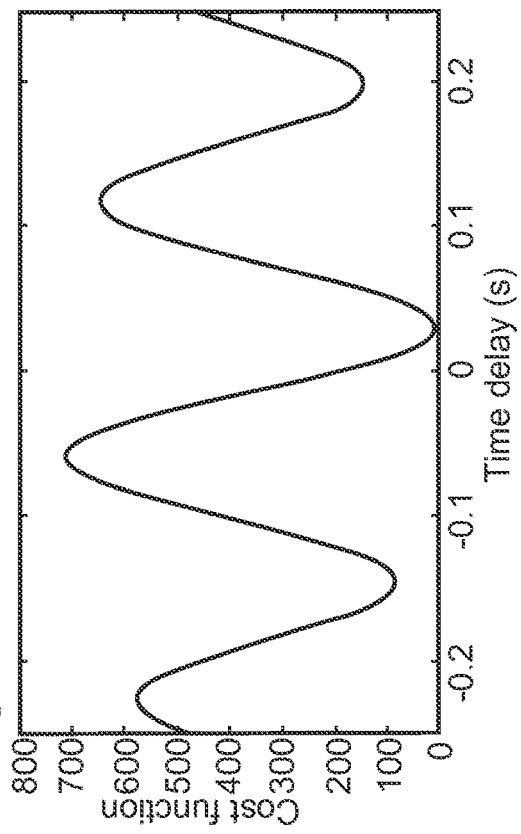
FIG. 5C illustrates the probability distribution function of the measured frequency.
Figure 5D:
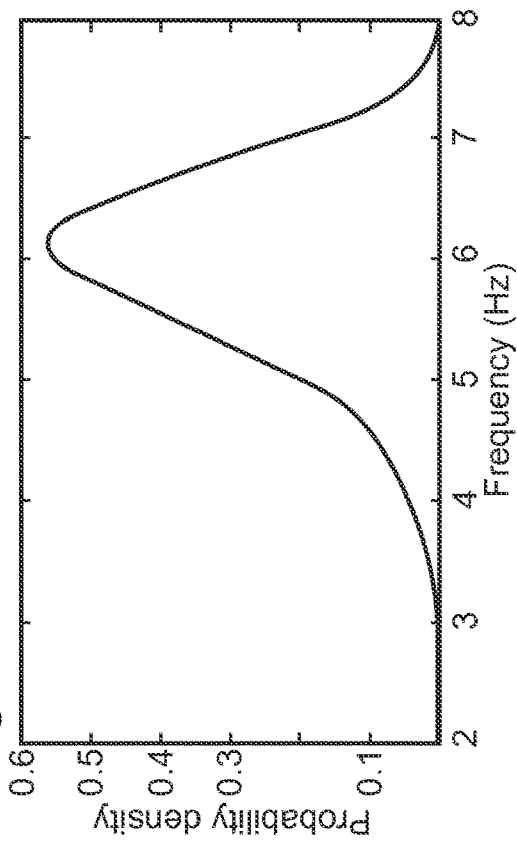
FIG. 5D illustrates the probability of cycle-skipping versus time delay calculated based on a probabilistic measure according to an embodiment.
Figure 8:
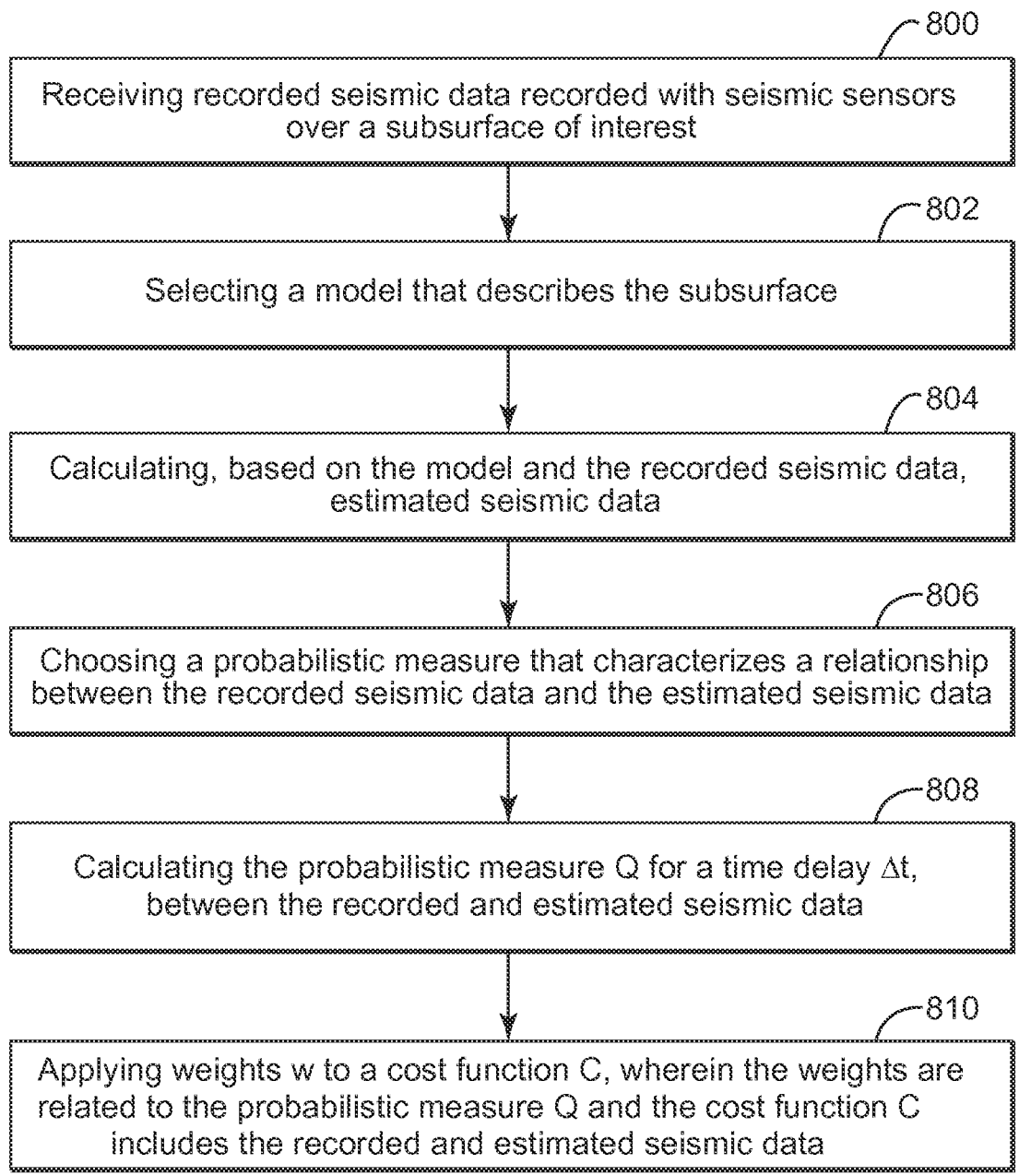
FIG. 8 is a flowchart of a method that weights terms of a cost function based on a probabilistic measure.

The above-discussed concepts are illustrated in FIGS. 5A-D. FIG. 5A illustrates the cost function used to infer the time delay between the recorded data and the estimated data. The global minimum represents the correct time delay while the other minima are cycle-skipped. The PDF for the time delay derived from FIG. 5A is illustrated in FIG. 5B. The amplitude spectrum of the seismic data interpreted as the PDF of the frequency is illustrated in FIG. 5C, and FIG. 5D illustrates the probability of cycle-skipping, Q (=1−CDF), as a function of the time delay. Note that Q does not suffer from wrap-around, i.e., for large values of the time delay, it continues to have a value of 1. The time delay corresponding to Q=0.5 is shown in FIG. 5D as an indication of the cycle skipping criterion if there were no uncertainties present. A threshold for Q can be chosen above which the risk of cycle-skipping is considered unacceptable and traces where Q exceeds this threshold are flagged so that the operator can decide how to handle those traces.

A method that calculates a probabilistic QC measure for cycle-skipping in full waveform inversion is now discussed with regard to FIG. 6. The method includes a step 600 of receiving recorded seismic data ($d_{rec}$) recorded with seismic sensors over a subsurface of interest, a step 602 of selecting a model (m) that describes the subsurface, a step 604 of calculating, based on the model m and the recorded seismic data $d_{rec}$, estimated seismic data ($d_{est}$), and a step 606 of choosing a probabilistic measure (e.g., the CDF or Q) that characterizes a relationship between the recorded seismic data $d_{rec}$ and the estimated seismic data $d_{est}$. The probabilistic measure includes at least one statistical function (PDF). As noted above, the probabilistic measure (Q in this embodiment) is a probability that the corresponding trace will experience cycle-skipping.

Note that the QC procedure discussed above informs the operator which traces may create problems for the FWI methods, but does not remove or correct or update the traces to avoid these problems. Thus, the embodiments discussed above disclose how a probabilistic interpretation of measured time-shifts and frequency content can provide a robust and reliable QC of cycle-skipping in FWI, thus evaluating the suitability, or not, of a given starting model in 602.

According to another embodiment, it is possible to determine a probabilistic measure that relies on the measured time delay Δt between the recorded data $d_{rec}$ and estimated data $d_{est}$ and indicates what is the maximum frequency that can be used without compromising the inversion. This means that the probabilistic measure is capable of indicating data in a trace that can be used in the FWI while other data in the trace cannot. In this regard, given an amplitude spectrum S(f) for a trace or for the entire recorded seismic data, the mean frequency <f> is given by:

$$\langle f \rangle = \int_{f_{min}}^{f_{max}} S(f) df, \qquad (2)$$

where $f_{min}$ and $f_{max}$ are the minimum and maximum frequencies of interest. If the time delay is fulfilling $\Delta t \geq (2\langle f \rangle)^{-1}$, then gradient-based algorithms will converge toward a local minimum rather than the global one and, hence, the updated velocity model will be cycle-skipped.

Thus, according to an embodiment, time delay Δt is used to define the maximum frequency to be used for FWI purposes that avoids cycle-skipping. Note that each recorded trace includes all or most of the frequencies of interest, and the method discussed herein limits the frequency spectrum to be used for the FWI by calculating a new $f_{max}$ that prevents cycle-skipping. More specifically, the limit for $f_{max}$ is selected such that:

$$\langle f \rangle < (2\Delta t)^{-1}. \qquad (3)$$

In one implementation, the highest value of $f_{max}$ is chosen by integrating the amplitude spectrum S(f) so that the condition of equation (3) is fulfilled, which results in:

$$\int_{f_{min}}^{f_{max}} S(f) df < (2t)^{-1}. \qquad (4)$$

However, note that there are other methods of deriving the characteristic frequency, such as a predictive error filter, etc.

According to another embodiment, a probabilistic method that implements equation (3) is now exemplified. Those skilled in the art would know that other probabilistic functions may be used to implement equation (3). The probability Q of the time delay Δt exceeding a predetermined threshold is given by probabilistic measure Q:

$$Q(\Delta t | \langle \Delta t \langle, \sigma_{\Delta t} \rangle f \rangle, \sigma_f) = 1 - \int_0^{|\Delta t|} PDF(\tau) d\tau, \qquad (5)$$

where τ is a dummy time variable. The PDF includes uncertainties in the mean time delay ⟨Δt⟩ and the mean frequency ⟨f⟩, namely $\sigma_{\Delta t}$ and $\sigma_f$. One possible form of the PDF may be:

$$PDF(\tau) = \frac{1}{\left[2\pi \left(\sigma_t^2 + \frac{1}{4}\sigma_f^2 \langle f \rangle^{-4}\right)\right]^{\frac{1}{2}}} e^{-\frac{1}{2}\frac{(|\langle \Delta t \rangle| - \tau)^2}{(\sigma_t^2 + \frac{1}{4}\sigma_f^2 \langle f \rangle^{-4})}}. \qquad (6)$$

Those skilled in the art would appreciate that other forms for the PDF may be used, or even other statistical functions instead of the PDF.

The predetermined threshold T may be selected, in one embodiment, such that any trace having its probability Q value larger than T is considered unacceptable for FWI, i.e., that trace is prone to cycle-skipping. Thus, the time $t_T$ at which $Q(t_T)=T$ may be calculated. In one embodiment, the value of the predetermined threshold T is selected to be 0.05, or a 5% probability that the data is cycle-skipped. This is equivalent to a 2σ confidence level. Using equation (4), the maximum frequency $f_{max}$ may expressed as:

$$\langle f \rangle < (2t_T)^{-1}. \qquad (7)$$

The above-discussed method can be used to predict the maximum frequency to be used in the next update of FWI, whether this is the first FWI iteration, or a subsequent one.

In practice, it is likely that the value of $f_{max}$ varies along a survey. This means that the value of $f_{max}$ can change from trace to trace. Estimated shots from areas that are difficult to image are likely to show longer delay times $\Delta t$ and, hence, lower values of $f_{max}$. A likely strategy is then to create histograms of $f_{max}$ for the whole survey, and choose a value lower than that for a fraction of the survey. For example, a maximum frequency is chosen so that it is below the value of $f_{max}$ for 80% of the traces of the survey. It may not be practical to attempt a value low enough to meet the $f_{max}$ for 100% of the traces of the survey because this choice is likely to lead to an impractically low frequency.

According to an embodiment, a method for identifying seismic traces prone to cycle-skipping in a full waveform inversion method includes a step 700 of receiving recorded seismic data recorded with seismic sensors over a subsurface of interest, a step 702 of selecting a model that describes the subsurface, a step 704 of calculating, based on the model and the recorded seismic data, estimated seismic data, a step 706 of choosing a probabilistic measure that characterizes a relationship between the recorded seismic data and the estimated seismic data, and a step 708 of calculating a maximum frequency $f_{max}$ based on the probabilistic measure, wherein frequencies below the maximum frequency are unlikely to have cycle-skipping.

While the various embodiments discussed above have targeted a QC approach to the cycle-skipping problem, the next embodiments address the cost function of the FWI procedure and present probabilistic approaches to be implemented in the cost function to mitigate the cycle-skipping problem.

As previously discussed, FWI implementations using gradient-based algorithms converge to the global minimum only if the starting point is close enough. More sophisticated inversion algorithms do exist, but they are more expensive and their application is currently beyond industrial implementations of FWI. The criterion for convergence towards the global minimum is known in the art, namely, that the estimated and recorded data agree within half a period. If not, then FWI will converge to a wrong model (a local minimum) even though the cost function will decrease. Determining whether a given velocity model is good enough becomes an exercise in checking whether the estimated traces are not cycle-skipped with respect to the recorded ones. A basic phase difference between recorded and estimated data can be used to highlight areas of cycle-skipping. Such a QC requires some degree of interpretation to extract the necessary information, which is undesired. Thus, one or more of the embodiments here present a different approach that is based on a probabilistic interpretation of frequency and time-shift.

As discussed above, estimated traces are created using the starting velocity model, and their difference with the recorded data gives a cost function to be minimized by FWI. Because the amplitude spectrum of the traces has a limited bandwidth (the seismic frequency spectrum of interest is substantially between 1 and 300 Hz) and non-zero mean frequency, in the time domain, the wavelet has two characteristic timescales: (i) an outer envelope with a period inversely proportional to the bandwidth $\Delta f$, and (ii) a generally higher-frequency oscillation with a period inversely proportional to the mean frequency $\langle f \rangle$. If the estimated traces have a delay time $\Delta t$ compared to the recorded data that is greater than $(2\langle f \rangle)^{-1}$, then gradient methods will converge toward a local minimum, and the updated velocity model will be biased. Embodiments discussed above used probabilistic QC methods (see FIGS. 6 and 7) for identifying cycle-skipping in the traces.

The probabilistic approach may be extended from a QC to an update in the cost function to weight down the cycle-skipped traces. This approach maximizes the amount of data used for FWI, since traces with a moderate probability of cycle-skipping are still used (albeit weighted down), rather than discarded.

In addition, compared to the strategy of cutting off data when a threshold probability of cycle-skipping is reached, the method according to this embodiment potentially allows the removal of only the "pathological" traces at particular locations. For example, if in a subsurface region only the middle offsets have the probability Q of cycle-skipping larger than the predetermined threshold, the traditional cut-off strategy would remove all traces with offsets beyond the first pathological trace. This traditional approach correctly removes the middle offsets, but also removes the high offsets needlessly. Weighting down traces by their probability of cycle-skipping, as proposed in this embodiment, will remove the influence of the middle offsets while preserving the influence of the high offsets.

One particular way of weighting the cost function is now discussed. Those skilled in the art would readily understand that other ways of weighting the cost function may be derived from this particular implementation. Thus, this implementation is intended to be an exemplary approach for a better understanding of the general concept of weighting down the unusable data from the FWI point of view.

In one implementation, the cost function is calculated as follows:

$$C(m) = \frac{1}{2} \sum_i^{n_s} \sum_j^{n_r} \sum_k^{n_t} |d_{est,i,j,k} - d_{rec,i,j,k}|^2 \qquad (8)$$

where m is the model parameter (e.g., velocity), $n_s$, $n_r$ and $n_t$ are the number of sources, the number of receivers and the time samples in the dataset, respectively, and i, j, and k are the shot, receiver and time indices, respectively.

To introduce the probabilistic approach, a weight w that depends on indices i, j and k is introduced in equation (8) as follows:

$$C(m) = \frac{1}{2} \sum_i^{n_s} \sum_j^{n_r} \sum_k^{n_t} w(i,j,k) |d_{est,i,j,k} - d_{rec,i,j,k}|^2 \qquad (9)$$

In one embodiment, weight w depends only on the shot index i and the receiver index j. Weight w may be calculated for every time sample in a seismic trace.

Weight w may be implemented to include at least one probabilistic measure or function. For example, weight w(i,j) may be implemented to be a probability that a given trace is not cycle-skipped. Such an example is described as follows:

$$w(i,j) = 1 - Q(\Delta t = (2\langle f \rangle)^{-1} | \langle \Delta t \rangle, \sigma_{\Delta t}, \langle f \rangle, \sigma_f), \qquad (10)$$

where Q is the probability that a trace is cycle-skipped. In one application, Q is given by equations (5) and (6), although those skilled in the art would appreciate that other forms for Q may be used, or even other statistical functions instead of Q. Irrespective of the configuration of Q, the probability Q that the trace is cycle-skipped is given by calculating Q at $|\Delta t|=(2\langle f \rangle)^{-1}$, as also expressed by equation (10).

According to this embodiment, traces that have a negligible probability of being cycle-skipped (i.e., $Q \approx 0$) are given a weight of substantially 1. Traces with almost certainty of cycle-skipping (i.e., $Q \approx 1$) are given zero weight, which is equivalent to entirely masking such areas. However, traces in the region with $0<Q<1$ are given weights between 0 and 1, and are therefore included in the calculation of the cost function and, hence, in the inversion. This means the data are used, but they would be weighted down. This extra data taken into account may be useful to improve the model on transition regions.

In other words, FWI is often used to improve a model m (e.g., a velocity model) in difficult areas. Transition regions in between the areas where the model is good and bad are particularly important. For an FWI update, they can represent the region where the model transitions from not being cycle-skipped and, hence, safe to update, to being cycle-skipped and, hence, not updated meaningfully. Maximizing the use of data in such a region is therefore of particular interest because it will help the FWI update to gradually improve the model in such regions. Removing data with high probability of cycle-skipping avoids updating the model in the wrong direction on bad areas. Thus, selectively weighting the data can help update the transition regions, and the scheme discussed herein is designed to do exactly that, i.e., it enables the use of data in this region, while still allowing the cost function to be further influenced by regions where the current model is safe from cycle-skipping.

According to an embodiment, a method for weighting seismic traces prone to cycle-skipping in a full waveform inversion includes a step 800 of receiving recorded seismic data recorded with seismic sensors over a subsurface of interest, a step 802 of selecting a model that describes the subsurface, a step 804 of calculating, based on the model and the recorded seismic data, estimated seismic data, a step 806 of choosing a probabilistic measure that characterizes a relationship between the recorded seismic data and the estimated seismic data, wherein the probabilistic measure includes at least one statistical function, a step 808 of calculating the probabilistic measure Q for a time delay $\Delta t$, between the recorded and estimated seismic data, and a step 810 of applying weights w to a cost function C, wherein the weights are related to the probabilistic measure Q, and the cost function C includes the recorded and estimated seismic data.

Figure 9:
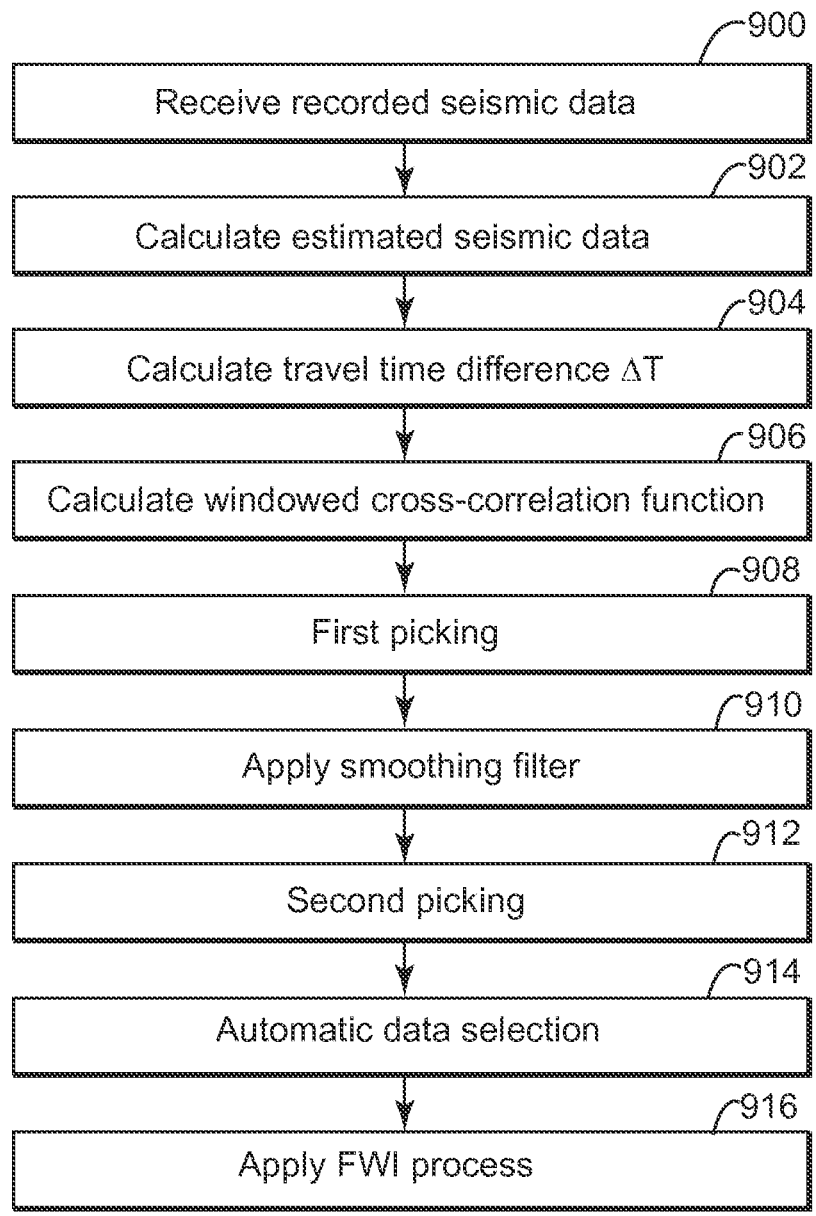
FIG. 9 is a flowchart of another method that weights terms of a cost function based on a data selection analysis.

According to another embodiment illustrated in FIG. 9, there is another method for applying a weighting to the cost function based on a data selection analysis. This method receives in step 900 recorded seismic data $d_{rec}$. The recorded seismic data may be recorded on land or water, with hydrophones, geophones, accelerometers, or a combination of them. In other words, the recorded seismic data may be single component (e.g., pressure) or multicomponent (e.g., velocity, acceleration, etc.). The method calculates in step 902 estimated seismic data $d_{est}$ based on a starting model (e.g., velocity model) of the surveyed subsurface. In step 904, the method calculates the travel-time difference (time delay $\Delta t$) between the recorded data $d_{rec}$ and estimated data $d_{est}$. This travel-time difference information can be converted to phase difference information. For example, if a single frequency f is considered, the phase difference $\varphi$ (measured in radians) is given by $\varphi = 2\pi \cdot \Delta t \cdot f$, where the time delay $\Delta t$ is measured in seconds and the frequency f is measured in Hz. Data selection for mitigating cycle-skipping in FWI is then implemented by only using data with a phase difference between the recorded and estimated traces of less than a half cycle, namely $\pi$ radians (or equivalently) 180°. This process may be performed for each FWI iteration.

According to this embodiment, the travel-time difference $\Delta t$ is estimated using a windowed cross-correlation function. A windowed cross-correlation coefficient of two corresponding time sequences $d_{rec}(t)$ (recorded data) and $d_{est}(t)$ (estimated data), with window size N and time-lags l is calculated in step 906 using the expression:

$$c_l = \frac{1}{N} \frac{\langle d_{rec} - \langle d_{rec} \rangle | d_{est_l} - \langle d_{est} \rangle \rangle}{\sigma_{d_{rec}} \sigma_{d_{est}}}, \quad (11)$$

where $\langle d_{rec} | d_{est} \rangle$ is the inner product of the two sequences $d_{rec}$ and $d_{est}$, $\langle d_{rec} \rangle$ and $\sigma_{d_{rec}}$ are the average and standard deviation within the window, respectively, and $d_{est_l}$ is the sequence with lag of l. Those skilled in the art would appreciate that the inner product can be implemented in various ways. The cross-correlation coefficient $c_l$ is maximized when the two sequences best match in both time shift and event registration. By calculating $c_l(x)$ near the first event (along a given trace) of each offset x and picking the first maximum peak I(x) in step 908, it is possible to estimate a guide line of the travel-time difference between the recorded data and estimated data. This repeated process of forming followed by smoothing a guide of the travel-time differences allows the influence of noisy traces to be downweighted. The guide itself is a set of time-lags that "guides" the next iteration of the cross-correlation process.

A linear smoothing filter may then be applied in step 910 to the picked guide over the different offsets, as follows:

$$\tilde{l}(x_0) = \sum_{x=x_0-d}^{x_0+d} l(x)w(x_0, x) / \sum_{x=x_0-d}^{x_0+d} w(x_0, x)' \quad (12)$$

where:

$$w(x_0, x) = \exp\left(-\frac{|x-x_0|}{d}\right) \exp\left(-\frac{(1-c_l(x))^2}{p}\right). \quad (13)$$

In the above equations, the weighting factor $w(x_0, x)$ is determined by the distance between the center point $x_0$ and reference point x with exponential decay factor d, and the reference cross-correlation coefficient $c_l(x)$ with probability factor p. A higher cross-correlation coefficient suggests a more reliable estimation and is spread to its neighbors for smoothing. For example, it is possible to apply adaptive moving window to perform automatic data selection, progressively compensating time difference in each window, calculating a similarity between recorded data and estimated data in each adaptive window, with continuous constrain of neighboring windows, and labeling and muting bad data based on time difference and similarity criteria. Other weighting schemes in this linear smoothing filter can be used to achieve the same goal as equation (13).

A second picking from the given trace is performed in step 912, near the smoothed guide line, to provide a more accurate estimation. This procedure may be iterative; however, in some tests performed based on this procedure, one iteration was usually sufficient. Next, the process, which may be implemented on a computing device as discussed later, performs automatic data selection in step 914, where only data with a phase difference of less than half cycle is selected to reduce the effect of cycle-skipping. In one embodiment, the conversion of the travel-time difference into a phase difference may happen, for example, at step 914, just before the data selection criterion is applied.

This data selection procedure includes two steps: discard bad traces and mute bad data (inner mute).

The travel-time difference estimated above is used to determine bad traces via the phase difference limitation. For the selected traces, an adaptive moving window is applied to calculate the similarity between the recorded data and estimated data, where the time difference down the trace is progressively compensated by the previous windows based on equation:

$$l(x, t) = l(x, t - \Delta t) + \operatorname*{argmax}_{k}\{\tilde{c}(t, k)\}, \quad (14)$$

where $\tilde{c}(t, k)$ is the cross-correlation coefficient of equation (11) calculated with lag k in the window at $d_{rec}(x,t)$ and $d_{est}(x, t+l(x,t))$, with window size of $\Delta t$. The compensations are subject to continuous constraint to minimize cycle-skipping between neighboring windows, i.e., $|l(x,t)-l(x, t-\Delta, t)|<$diff, where diff is the maximum allowed travel-time difference between the neighboring windows. Those discontinuities reflect unmatched or cycle-skipped events, and are used to improve the data selection. The time shifts $l(x,t)$ are converted in step 914 to phase by multiplying them by frequency. Data with a phase difference of more than half cycle are muted. Then, in step 916, the FWI is applied to the selected data.

Figure 10C:
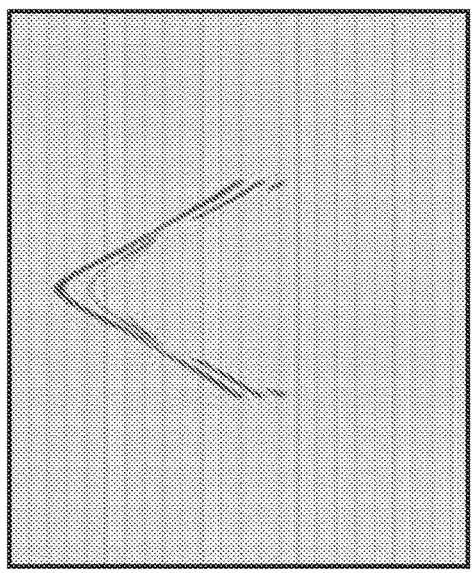
FIG. 10B illustrates estimated seismic data and FIG. 10C illustrates a result of data selection that mitigates cycle-skipping.
Figure 10B:
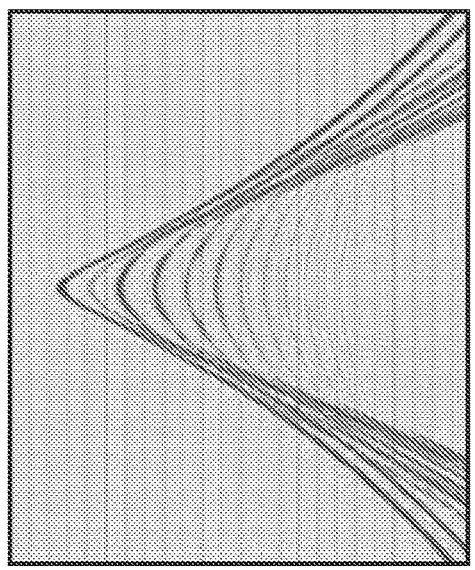
Figure 10A:
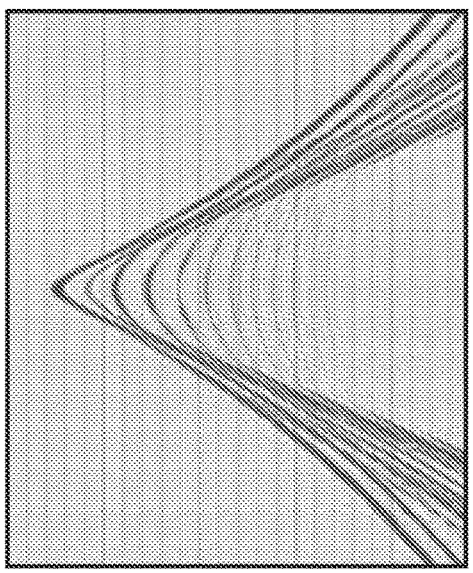
FIG. 10A illustrates recorded seismic data.

FIG. 10C shows an example of a data selection result. Even when the travel-time difference is very small, the data mismatch between the two windows of recorded data (see FIG. 10A) and estimated data (see FIG. 10B) can still occur due to missing events or crossing of refraction and reflection energy. The matching quality is also partially determined by the maximum coefficient $\tilde{c}(t, k)$ of each window, and those below a specified threshold are labeled as bad and muted.

According to an embodiment, hydrophone and/or particle velocity data collected from receivers (located on streamers, ocean bottom cables, autonomous vehicles, etc.) are processed according to one or more of the embodiments discussed above. Note that in the field of oil and gas, there are well-established processes for taking seismic raw data and applying various known processing steps, e.g., migration, FWI, denoising, deghosting, etc., for generating an image of the surveyed subsurface. Based on this image, which can be represented in print, on a screen, in a tabular way, etc., an oil and gas reservoir interpreter determines whether oil and/or gas is present in the surveyed subsurface and advises an oil and gas company where to drill a well. The embodiments discussed above improve this technological process of detecting oil and/or gas reservoirs by mitigating cycle-skipping, which results in a more accurate subsurface image and hence reduced cost associated with the drilling process.

In one embodiment, receivers generate a marine streamer dataset that is achieved in a narrow, wide or multi-azimuth coil shooting or any configuration towed with constant or variable depth (e.g., slant streamer, BroadSeis profile, over-under streamers), and the seismic data is generated with an air gun, marine vibrator, or other source element. Source elements may be fired according to any known scheme, e.g., continuously, simultaneously, flip-flop, etc. Receivers may also be used in ocean bottom survey (nodes, cables, or other with air gun, marine vibrator or other source), land dataset (dynamite, vibrator or other source), or a combination of two or more dataset types. The data may have been calibrated before applying the processes discussed herein, or calibration scalars may be included in the formulations noted in the embodiments. Water velocity terms may be constant or allowed to vary with depth. Variation with depth can be of use for datasets where there is a water velocity gradient. The methods may be used for one-sided or split-spread acquisition.

Equations described herein may be solved in the time domain or a spectral domain (e.g., frequency, Laplace, z-transform, etc.), wavelet domain (e.g., curvelet or other). Model m may be found through any inversion method, e.g., conjugate gradients, LU decomposition, Cholesky factorization, etc. Model m may be derived to represent all traces in the input shot, or may work on a subset of data from the input shot, for example, spatial windows of a given number of channels. Sparseness weights may be used in the inversion to improve results, for example, where there is poor signal-to-noise ratio or to overcome aliasing; e.g., iteratively reweighted least squares beginning with low frequencies and working up to higher frequencies. Other model domains may be used, for example, frequency-wavenumber (FK), parabolic Radon, hyperbolic Radon, etc. In fact, any fixed datum model domain may be defined as long as it can be reverse-transformed, redatumed and reghosted for both hydrophone and particle velocity sensor data. Alternatively, an iterative approach similar to the anti-leakage tau-p transform can be used, which also exhibits sparseness properties. No matter how the model is formed, it needs to simultaneously reproduce the hydrophone and particle velocity measurements through application of an operator, e.g., L.

Due to differing signal-to-noise ratios of hydrophone and particle velocity data, it may be necessary to define the inversion so as to satisfy the hydrophone data for a broader bandwidth than the particle velocity data. This may be implemented by including a frequency-dependent scaling term into the algorithm or bandpass filtering the model and data for different conjugate gradient passes either by multiplication in the frequency domain or convolution by a bandpass filter in the time domain. For example, application of L may include a bandpass filter so that, when applied, the bandwidth of particle velocity components is 25 Hz to 250 Hz, whereas the bandpass filter for hydrophone data is 2 Hz to 250 Hz.

It can also be possible to process hydrophone and particle motion data independently. The separate results may be combined afterward, for example, by selecting different temporal frequency ranges based on signal-to-noise ratio data. At low frequencies, particle velocity data may be too noisy to be of value. Therefore, it may be necessary to use a pressure-only solution for low frequencies, and make use of a combined hydrophone-particle velocity solution for higher frequencies.

A generalized weighting scheme can be implemented to vary weighting between any component (hydrophone or particle motion) depending on the receiver, time and frequency, and/or wavenumber. This weighting refers to how well the model represents the data. Typically, accelerometer data is integrated to calculate particle velocity measurements. Instead of integrating accelerometer data before wave-field separation, it is also possible to build a differentiation operator into the inversion scheme. As an alternative to the described modeling approach, other forms of wave-field extrapolation may be used, which may include Kirchhoff, beam, wave-equation (one-way or two-way, RTM, etc.).

Figure 11:
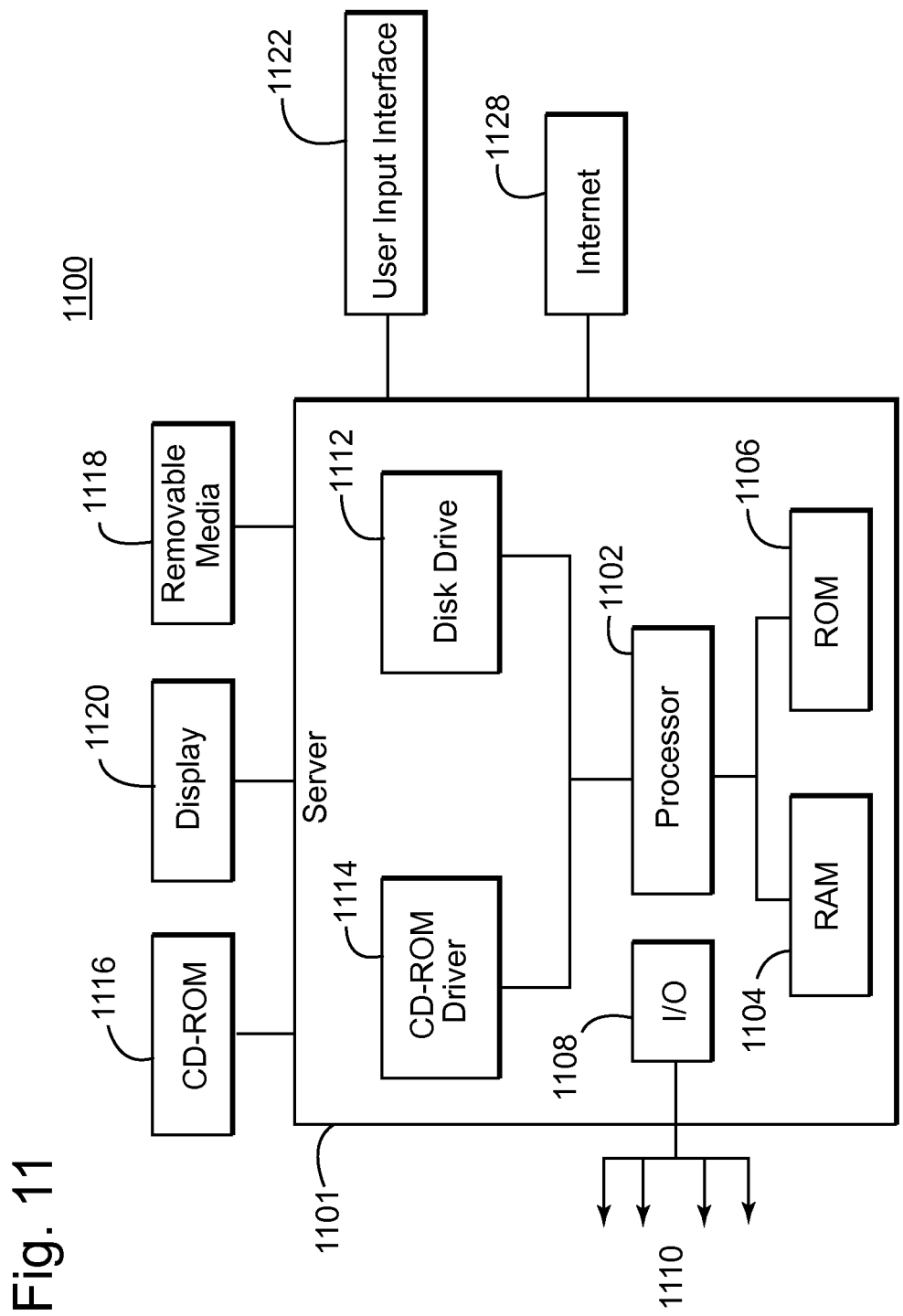
FIG. 11 is a schematic diagram of a computing device that can implement any of the methods discussed herein.

The above-discussed procedures and methods may be implemented in a computing device as illustrated in FIG. 11. Hardware, firmware, software or a combination thereof may be used to perform the various steps and operations described herein. Computing device 1100 of FIG. 11 is an exemplary computing structure that may be used in connection with such a system.

Exemplary computing device 1100 suitable for performing the activities described in the exemplary embodiments may include a server 1101. Such a server 1101 may include a central processor (CPU) 1102 coupled to a random access memory (RAM) 1104 and to a read-only memory (ROM) 1106. ROM 1106 may also be other types of storage media to store programs, such as programmable ROM (PROM), erasable PROM (EPROM), etc. Processor 1102 may communicate with other internal and external components through input/output (I/O) circuitry 1108 and bussing 1110 to provide control signals and the like. Processor 1102 carries out a variety of functions as are known in the art, as dictated by software and/or firmware instructions.

Server 1101 may also include one or more data storage devices, including hard drives 1112, CD-ROM drives 1114 and other hardware capable of reading and/or storing information, such as DVD, etc. In one embodiment, software for carrying out the above-discussed steps may be stored and distributed on a CD-ROM or DVD 1116, a USB storage device 1118 or other form of media capable of portably storing information. These storage media may be inserted into, and read by, devices such as CD-ROM drive 1114, disk drive 1112, etc. Server 1101 may be coupled to a display 1120, which may be any type of known display or presentation screen, such as LCD, plasma display, cathode ray tube (CRT), etc. A user input interface 1122 is provided, including one or more user interface mechanisms such as a mouse, keyboard, microphone, touchpad, touch screen, voice-recognition system, etc.

Server 1101 may be coupled to other devices, such as sources, detectors, etc. The server may be part of a larger network configuration as in a global area network (GAN) such as the Internet 1128, which allows ultimate connection to various landline and/or mobile computing devices.

The disclosed exemplary embodiments provide a computing device, software instructions and a method for seismic data processing. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A seismic exploration method comprising:
   receiving seismic data recorded with seismic sensors over a subsurface of interest;
   identifying traces, from the recorded seismic data, as prone to cycle skipping based on comparisons of probabilistic measures of the traces with a predetermined threshold, the identifying including:
      calculating estimated seismic data corresponding to the recorded seismic data using an initial model, and
      calculating a probabilistic measure that characterizes differences between corresponding traces of the recorded seismic data and of the estimated seismic data, wherein the probabilistic measure is based on a statistical function;
   determining a structural model of the subsurface by applying a full waveform inversion, FWI, technique to update the initial model, the FWI technique employing a cost function in which differences between the traces of the recorded seismic data, identified as prone to cycle skipping, and traces of the estimated seismic data are weighed down, the structural model providing an enhanced image of the subsurface relative to an image obtained without weighing down the differences in the cost function, the enhanced image being used to detect oil and gas reservoirs in the subsurface.

2. The method of claim 1, wherein the statistical function is a probability distribution function (PDF).

3. The method of claim 2, wherein the PDF is characterized by a mean of a delay time $\Delta t$ between the corresponding traces of the recorded seismic data and of the estimated seismic data and a standard deviation $\sigma_{\Delta t}$ of a time delay distribution.

4. The method of claim 3, further comprising:
   determining a mean frequency $<f>$ and a mean frequency uncertainty $\sigma_f$ by considering an amplitude spectrum of the measured seismic data as characterizing the PDF.

5. The method of claim 4, further comprising:
   calculating a cumulative distribution function (CDF), or a probability of cycle skipping Q=1−CDF, based on the PDF, which is characterized the mean delay time and a mean delay uncertainty, and the mean frequency and the mean frequency uncertainty.

6. The method of claim 1, further comprising:
   calculating a maximum frequency $f_{max}$ based on the probabilistic measure, wherein frequencies below the maximum frequency are unlikely to have cycle-skipping.

7. The method of claim 1, wherein the probabilistic measure is derived from a probability distribution function, PDF, calculated for a measured time delay between the recorded and the estimated seismic data.

8. The method of claim 7, wherein a maximum frequency is given by an integral of amplitude spectrum between a minimum frequency and the maximum frequency being smaller than an inverse of twice the time delay.

9. The method of claim 1, further comprising:
   calculating the probabilistic measure for a time delay $\Delta t$, between corresponding traces of the recorded and traces of the estimated seismic data;
   wherein, in the cost function used by the FWI technique, weights applied to the differences between the traces of the recorded seismic data, identified as prone to cycle skipping, and traces of the estimated seismic data are related to the probabilistic measure.

10. A seismic exploration method comprising:

receiving recorded seismic data $d_{rec}$ acquired with seismic sensors over a subsurface of interest;

generating estimated data $d_{est}$ based on a starting model of the surveyed subsurface;

calculating a travel-time difference ($\Delta t$) for each trace between the recorded seismic data $d_{rec}$ and the estimated data $d_{est}$;

converting the travel-time difference ($\Delta t$) to a phase difference using a single frequency;

selecting traces with the phase difference of less than a half cycle; and feeding the selected traces in the recorded seismic data to a full-wave inversion (FWI) for calculating physical properties of the subsurface of interest, thereby obtaining an enhanced image of the subsurface of interest relative to an image obtained using all the traces, the enhanced image being used for detecting oil and/or gas reservoirs.

11. The method of claim 10, wherein the starting model is a velocity model.

12. The method of claim 10, further comprising:

replacing the starting model with an improved model output by the FWI and repeating the generating of the estimated data, the calculating of the travel-time difference, the converting of the travel-time difference, the selecting of the traces and the feeding of the selected traces to the FWI.

13. The method of claim 10, wherein the travel-time difference ($\Delta t$) is estimated using a windowed cross-correlation function.

14. The method of claim 13, further comprising:

calculating a weight for each trace based on the cross-correlation function, and smoothing the selection based on the weight.

15. The method of claim 14, wherein a corresponding weight is calculated for every time sample in a seismic trace.

16. A computing device comprising:

an interface configured to receive recorded seismic data acquired with seismic sensors over a subsurface of interest;

and a processor connected to the interface and configured to identify traces, from the recorded seismic data, as prone to cycle skipping based on comparisons of probabilistic measures of the traces with a predetermined threshold, by:

calculating estimated seismic data corresponding to the recorded seismic data using an initial model, and calculating a probabilistic measure that characterizes differences between corresponding traces of the recorded seismic data and of the estimated seismic data, wherein the probabilistic measure is based on at least one statistical function, and to determine a structural model of the subsurface by applying a full waveform inversion, FWI, technique to update the initial model, the FWI technique employing a cost function in which differences between the traces of the recorded seismic data, identified as prone to cycle skipping, and traces of the estimated seismic data are weighted down, the structural model providing an enhanced image of the subsurface relative to an image obtained without weighing down the differences in the cost function, the enhanced image being used to detect oil and gas reservoirs in the subsurface.

17. The computing device of claim 16, wherein the statistical function is a probability distribution function (PDF).

18. A computing device comprising:

an interface configured to receive recorded seismic data $d_{rec}$ acquired with seismic sensors over a subsurface of interest; and a processor connected to the interface and configured to, generate estimated data $d_{est}$ based on a starting model of the surveyed subsurface, calculate a travel-time difference ($\Delta t$) for each trace between the recorded data $d_{rec}$ and the estimated data $d_{est}$, convert the travel-time difference ($\Delta t$) to a phase difference using a single frequency, select traces with the phase difference less than a half cycle, and feed the selected traces in the recorded seismic data to a full-wave inversion (FWI) for calculating physical properties of the subsurface of interest, thereby obtaining an enhanced image of the subsurface of interest relative to an image obtained using all the traces, the enhanced image being used for detecting oil and/or gas reservoirs.

19. The computing device of claim 18, wherein the starting model is a velocity model.

* * * * *